United States Patent Office 3,529,946
Patented Sept. 22, 1970

3,529,946
METHOD OF STRENGTHENING A GLASS ARTICLE BY ION EXCHANGE
Hellmuth G. Fischer, Toledo, and Augustus W. La Due, Maumee, Ohio, assignors to Owens-Illinois, Inc., a corporation of Ohio
No Drawing. Continuation of application Ser. No. 526,037, Feb. 9, 1966. This application Aug. 18, 1969, Ser. No. 853,595
Int. Cl. C03c 21/00; C03b 27/00
U.S. Cl. 65—30                                            5 Claims

ABSTRACT OF THE DISCLOSURE

An inorganic article which is a glass, thermally crystallizable glass or glass-ceramic is strengthened by contacting the article with an aqueous ion exchange medium containing alkali metal ions to provide a compressive surface layer thereon. The aqueous ion exchange medium such as an aqueous sodium nitrate solution is used with superatmospheric pressure to provide the strengthened articles.

---

This application is a streamlined contiuation of application Ser. No. 526,037, filed Feb. 9, 1966, and now abandoned.

This invention relates to a process for treating articles of glass, including glass components of articles, to improve the strength of the glass articles and also relates to the articles resulting from the treatment by the process. The present invention especially relates to a process for treating silicate glass composed of silica and alkali metal oxide or oxides, with or without one or more of other compatible constituents such as alkaline earth metal oxides, alumina, zirconia, titania, boron oxide, glass coloring oxides such as oxides of iron, cobalt, nickel, manganese, chromium and vanadium, and fining agents and also especially relates to the silicate glass article resulting from the treatment by the present process.

As used herein, the term "glass" means those inorganic glasses that (1) are not controllably crystallizable, and thus can be devitrified as the term is normally used, to form crystalline material usually in a matrix of a glass having a composition determined by the initial composition and by the composition of the crystalline material; (2) are controllably crystallized by a heat treatment; or (3) have been controllably crystallized by a heat treatment. Glass that is controllably crystallizable is commonly referred to as thermally crystallizable glass composition. A crystallized glass is commonly referred to as a glass-ceramic.

As described later in detail many types of silicate glasses, including glass-ceramics, that contain alkali metal ions have been treated at an elevated temperature by contact with an alkali metal inorganic salt for exchange of alkali ions in a surface portion of the glass with alkali metal ions of the inorganic salt. The usual process is an immersion of the glass in a molten bath of alkali metal inorganic salt or of a mixture of the alkali metal inorganic salt with other inorganic salts. The time of immersion is sufficient to cause this exchange only in a surface layer of the glass article. Lithium ions in a glass have been exchanged alternatively with sodium and potassium ions in molten inorganic salt baths. Sodium ions in glass have exchanged with lithium and potassium of molten salt baths containing lithium and potassium inorganic salts.

Alkali metal ions have different ionic diameters as can be seen on page 900 of the 3rd edition of Van Nostrand's Scientific Encyclopedia, published in 1958 by D. Van Nostrand Co., Inc., Princeton, N.J. The lithium ion has the smallest ionic diameter. The ionic diameters of the other alkali metal ions are in the order: sodium, potassium, rubidium and cesium, with cesium having the largest ionic diameter.

When a larger alkali metal ion replaces a smaller alkali metal ion in the surface layer of glass at a temperature that is below the strain point of the glass, the surface layer then has a compressional or compressive stress. Apparently the larger ions try to occupy the smaller spaces previously occupied by the smaller alkali metal ions, thereby creating the compressional stress in the surface layer. Because the temperature of the glass is below the strain point, the glass structure cannot readjust itself to relieve the stress.

When a smaller alkali metal ion replaces a larger alkali metal ion in the surface layer of the glass the expansion coefficient of the surface layer will be changed to a lower value than that of the interior part of the glass article and with the result that the surface layer has a compressional stress. This ion exchange can be carried out at a temperature either below the strain point or at a temperature above the strain but below the softening point of the glass. When the process of ion exchange is carried out below the strain point to replace a larger alkali metal ion in the glass with a smaller alkali metal ion, then the article after the actual exchange is then heated to a temperature sufficiently above the strain point to heal strength-reducing minute cracks occurring during the ion exchange treatment, due to the difference in the expansion coefficients of the interior and the surface layer. Then the stress and the resultant improved strength in the final product will be due to the compositional difference. When there is obtained by the ion exchange a surface layer that has a substantially lower coefficient of expansion than that of the interior glass, the ion exchange is performed as near to, but still below, the strain point as feasible, to avoid the creation of substantial cracks that would not be healed by the latter heating to a temperature above the strain point.

S. S. Kistler in a paper in the Journal of the American Ceramic Society, 45, No. 2, at pp. 59–68, and Research Corp. in British Pat. No. 917,388 describes an ion exchange process. The British patent mentions the following specific alkali metal inorganic salts that are suitable: $NaNO_3$; $KSCN$; $KNO_3$; $K_2S_2O_7$; $RbNO_3$. These are used in a molten form or as a solution in an organic, non-aqueous ionizing solvent, e.g., acetamide.

U.S. Pat. No. 2,779,136 lists various alkali metal salts for use in molten form to ion exchange with alkali metal ions of a glass. Only two of these are the salts of inorganic acids and lithium used alone, i.e., without admixture with other alkali metal salts. These two salts require the use of substantially high temperatures because of their high melting points. The melting points are reduced by mixing such salts with other alkali metal salts or alkaline earth metal salts. Even in such cases, the temperatures that have been used for the ion exchange are still substantially high, presumably due to the high melting points of such mixtures.

It is an object of the present invention to provide a process using an ion exchange medium that does not require the presence of salts of ions other than the alkali metal ion that is to replace another alkali metal ion in the surface layer of a glass.

It is a further object of the invention to provide a process using an ion exchange medium that is liquid at room temperature and thus can be easily removed from the ion-exchanged glass.

It is a further object of the invention to provide a process using a material as an ion exchange medium to treat a glass article to provide a product having a compressive stress surface layer with a glossy surface.

It is a further object of the present invention to provide a glass article obtained by the process of this invention, especially a glass article having a glossy surface.

Other objects and advantages of the invention will be apparent from the description of the invention that follows.

The process of the present invention comprises the treatment of a glass article by contacting the glass with an ion exchange aqueous medium, specifically, an aqueous solution of an alkali metal salt of a strong inorganic acid at an elevated temperature sufficiently high and for a period of time sufficient to ion exchange alkali metal ions of the salt of the inorganic acid with ions of a different alkali metal in the glass to provide a compressive stress layer in the glass article but for a time insufficient to provide such ion exchange to a substantial degree, preferably none, in the interior portion of the glass of the article.

Examples of alkali metal salts of strong inorganic or mineral acids are salts of acids as nitric acid, sulfuric acid, halogen acids (e.g., hydrochloric acid and anhydrobromic acid), and phosphoric acid. In the case of the strong inorganic acids having more than one replaceable hydrogen ion, it is not necessary that all of these hydrogen ions of the acid be replaced by alkali metal ion to be the salt that is used in the process of the present invention. Alkali metals are lithium, sodium, potassium, rubidium and cesium. The alkali metal salt that is used preferably contains the ions of the alkali metal that is adjacent in the Periodic Table of the Elements to the alkali metal present as ion in the glass. For example, when replacing a larger ion in the glass with a smaller ion, lithium salt and sodium salt are used for replacement of sodium ions and potassium ions, respectively, in the glass. For the preferred replacement, i.e., replacement of a smaller ion in the glass by a larger ion, for example, sodium salt and potassium salt are used to replace lithium ions and sodium ions, respectively, in the glass.

These alkali metal salts are water soluble. They may be used alone or as mixtures of such salts of the same alkali metal in the aqueous solution. They may be used alone or as mixtures with other salts, i.e., salts of metal ions other than the ions being replaced in the glass, but the presence of such other salts is not necessary, because a lowering of the melting point of the treating medium is not required. These other salts are also water-soluble salts.

The ion exchange medium containing water and the alkali metal salt of a strong inorganic acid issued at an elevated temperature, between about 200 and 550° C. (between about 380 and 1000° F.), preferably between about 300 and 430° C. (between about 570 and 800° F.).

Because the ion exchange medium contains water, the process is carried out at a superatmospheric pressure to prevent boiling of the water content of the medium. This is accomplished most conveniently and preferably by conducting the process in an autoclave so that the water of the ion exchange medium autogeneously provides the superatmospheric pressure to prevent boiling of the water.

The contact of the glass with the ion exchange medium at the elevated temperature is for a period of time that is dependent upon: (1) the temperature of the aqueous medium; (2) the type of ion exchange, that is, whether a smaller or larger alkali metal ion is being displaced from the glass surface portion; (3) the composition of the glass; (4) whether the glass is a glass-ceramic; and (5) the depth of the ion-exchanged surface layer that is to be provided as a compressive stress layer. Accordingly, the time of contact of the glass with the ion exchange medium can be as brief as a few minutes or it can be a substantial number of hours, e.g., 30 hours.

When the same quantity of aqueous ion exchange medium is used to carry out the process a number of times, there is dilution by alkali metal ions from the glass in the sense that such ions have replaced other alkali metal ions that were initially in the aqueous medium and now are in previously treated glass articles. For such reused aqueous ion exchange medium, the time of treatment for ion exchanging glass in a subsequent carrying out of the process will ordinarily be increased for a particular temperature of treatment.

In carrying out process of the present invention, it is preferred that the ion exchange medium also contain a small concentration of a strong inorganic acid, such as nitric acid, to provide an aqueous medium at approximately room temperature, such as 25° C., with a pH of greater than about 2 and less than about 4 to avoid inhibition of the ion exchange and to avoid producing a dulled surface on the glass, respectively, when carrying out this process.

The ion exchange aqueous medium preferably contains the alkali metal salt of a strong inorganic acid or mixtures salts of such alkali metal and various strong inorganic acids as a saturated solution at room temperature. However, lower concentrations of the salt or salts can be used. When the concentration is less than that of a saturated solution, suitable adjustment of temperature and/or time of treatment should be made to obtain somewhat comparable results. the aqueous medium should be at least 50% saturated (as regards water content) with these salts at room temperature. Of course, when the other salts are present, this concentration of the alkali metal salt that will ion exchange with the glass may be a saturated concentration with respect to the solvent as a solution of the other salt in the water.

The following examples illustrate the preferred embodiment of the present invention using two types of glass as the term has been defined above. Both of these types have been obtained, as described below, from the same molten glass and thus from the same glass batch.

This glass is obtained by melting batch materials in a large continuous furnace and has the following analyzed composition:

| | |
|---|---|
| $SiO_2$ | 71.3 |
| $Al_2O_3$ | 17 |
| $TiO_2$ | 1.8 |
| $MgO$ | 4 |
| $Li_2O$ | 3.5 |
| $ZrO_2$ | 1.3 |
| $P_2O_5$ | 1.5 |
| $F_2$ | 0.1 |
| $As_2O_3$ | 0.2 |
| $Fe_2O_3$ | 0.03 |

The glass is a thermally crystallizable glass having a co-efficient of thermal expansion of about $40 \times 10^{-7}/°$ C. The glass had an annealing point of about 1210°F. This glass has a composition that is very close to that shown on page 25 of th U.S. patent application Ser. No. 352,958, filed by William E. Smith on March 18, 1964, now Pat. No. 3,380,818, and entitled "Glass, Ceramics and Method" and having a common assignee. The batch materials used were the manufacture of that glass, but the amounts differ from those shown on page 24 of that application. The temperature in the furnace for melting the batch, the time of melting, the type of furnace and other conditions are described in said patent application Ser. No. 352,958. The description of that application is hereby incorporated by reference.

Gobs of glass were obtained from the molten glass in the tank at the time that the glass had been cooled to about 2275° F. These gobs of glass were then remelted in a platinum pot to obtain molten glass from which cane was pulled. A number of rods, each five inches in length, were made from the cane by cutting. These rods had a diameter of about 3/16 inch.

Some of the sample rods were ion exchanged by the process of the present invention, followed by a gradual cooling to avoid the creation of thermal stress, which itself increases glass strength. The cooled rods were washed with water to remove the aqueous treating medium.

Other sample rods were converted to glass-ceramic prior to the ion exchange treatment. Their conversion to a glass-ceramic was in accordance with the teaching of said application Ser. No. 352,958, which is also incorporated by reference. The rods of glass-ceramic from the heat treatment were cooled slowly to room temperature over a period of about four hours. The glass-ceramic had an average coefficient of lineal thermal expansion of about $15 \times 10^{-7}/°$ C. between about 23 and 688° C.

This glass as a crystallizable glass has a flexural strength before abrasion of about 16,000 p.s.i. and after abrasion of about 13,000 p.s.i.

The modulus of rupture in this formula gives the flexural strength in pounds per square inch of cross-sectional area at failure.

GLASS RODS

| | | |
|---|---|---|
| Temp., ° C | 300 | 330 |
| Pressure, p.s.i.g | 500 | 725 |
| Immersion time, hrs | 6 | 6 |
| Concn. of $NaNO_3$ (gm. per 100 ml. of water) | 180 | 250 |
| Nitric acid, added | Yes | Yes |
| pH of soln. at 25° C., at start of run | 3 | 3 |
| pH of soln. at 25° C., at end of run | 6 | 6 |
| Unabraded strength, p.s.i | 60,000 | 60,000 |
| Abraded strength, p.s.i | 27,000 | 55,100 |
| Average depth, $\mu$ | 60 | |
| Surface | Glossy | Glossy |

GLASS-CERAMIC RODS

| | | | | | |
|---|---|---|---|---|---|
| Temp., ° C | 300 | 300 | 300 | 330 | 316 |
| Pressure, p.s.i.g | | 500 | 200 | 725 | 550 |
| Immersion time, hrs | 3 | 6 | 6 | 6 | 24 |
| Concn. of $NaNO_3$ (gm. per 100 ml. of water) | 180 | 180 | 180 | 250 | 250 |
| Nitric acid, added | No | Yes | Yes | Yes | Yes |
| pH of soln. at 25° C., at start of run | 8 | 3 | 2 | 3 | 3 |
| pH of soln. at 25° C. at end of run | | 6 | 4 | 6 | 6 |
| Unabraded strength, p.s.i | 68,000 | 101,000 | 49,000 | 107,000 | 93,000 |
| Abraded strength, p.s.i | 62,000 | 25,000 | 20,000 | 45,000 | 76,000 |
| Average depth, $\mu$ | 90 | 22 | 9 | | |
| Surface | Etched | Glossy | Glossy | Glossy | Slightly etched |

Seven rods each of the thermally crystallizable glass and of the glass-ceramic resulting therefrom by heat treatment at least, were used per cycle of operation or per run of the autoclave treatment for ion exchange. The ion exchange aqueous medium was a solution of sodium nitrate in water, with or without added nitric acid. The rods were immersed in this medium. The autoclave was closed. After the treatment the rods were removed, cooled slowly to room temperature and washed with water. The runs were conducted at different temperatures, or time or both. The rods after this treatment were tested for their modulus of rupture. Some were tested for strength after abrasion. The results are presented below. All of the rods subjected to the autoclave treatment had a compressive stress layer.

The use of nitric acid to change the pH of the aqueous medium prior to the start of a run is indicated by the term "yes." the term "no" indicates that it was not added. The pH of the aqueous medium, in most cases, after the ion exchange treatment is also presented. The amount of sodium nitrate used with a stated volume of water to form the aqueous medium, the depth of the ion-exchanged surface layer in microns, the pressure in the autoclave during the ion exchange treatment, flexural strength of rod and surface condition are indicated.

The abrasion of rods comprised tumbling them for 15 minutes in a ball mill containing No. 30 silicon carbide grit.

The flexural strengths or modulus of rupture were determined using a Tinius-Olsen Testing Machine. This machine applies a measured load through a single knife edge to the center of the sample rod supported on two knife edges that are four inches apart (3-point loading). The load is applied at a constant rate of 24 lbs. per min. until failure occurs with a marker indicating the highest load applied to the point of failure. A dial micrometer calibrated in inches and equipped with a bar contact instead of a point contact is used to measure the maximum and minimum diameters at the center of the sample to an accuracy of 0.0005 inch. Since few sample rods are perfectly round, the load is applied normal to the maximum diameter and the standard formula for an elliptical cross-section is used in calculating the modulus of rupture as follows:

$$MR = \frac{(10.185) \times \text{Load}}{D_1^2 \times D_2}$$

Comparable runs were made using water instead of the aqueous sodium nitrate solution. The surface of these rods was highly dulled; however, the abraded and unbraded strengths were the same as similar rods that had not been treated in the autoclave. A comparison of these strength data with those tabulated above shows clearly that the ion exchange treatment resulted in a substantial increase in strength, especially in the unabraded strength. The data tabulated above also showed an improved strength after abrasion.

The advantage of adjusting the pH by the addition of nitric acid to the ion exchange aqueous medium can be seen. The undesirable result obtained when the pH is adjusted too far, namely, to the value of 2 instead to a ph of 3 is also seen. Other experiments have shown that, when the initial pH is about 4 or higher, dulled surfaces are obtained. When the pH is 2 or below the ion exchange is inhibited. This is seen by the example using an ion exchange aqueous medium with a pH of 2.

Although a slight film may remain on the crystallizable glass and the glass-ceramic after treatment by the process of the present invention at temperatures above 300° C., the film can be removed by polishing with a paper tissue.

The data tabulated above indicate that the treatment of glass, i.e., thermally crystallizable glass, gave a lower flexural strength, unabraded and abraded, than is obtained by the same treatment of the glass-ceramic, even though the former by the treatment had a thicker compressive stress layer than that produced on the glass-ceramic. A similar result has been obtained when using the known treatment of glass with a molten salt as a bath in which the glass is ion exchanged at an elevated temperature.

Many other runs have been made with variations in the time, temperature and concentrations of sodium nitrate and of nitric acid. Rods of improved flexural strength, even after abrasion, were obtained for both the thermally crystallizable glass and the glass ceramic. Even though the temperatures were between 300 and 330° C., the treatment according to the process of the present invention for 3 hours gave an abraded strength that was comparable to a 3-hour treatment at 400° C. in molten sodium nitrate. The best improvement of strength of this glass and glass-ceramic was obtained by the process of the invention at temperatures greater than 300° C. using pressure that ranged from 500 to 1100 p.s.i.g. and for times of treatment between 6 and 24 hours.

The glass used in the foregoing example is a type of glass that contains, as described by said patent application Ser. No. 352,958, at least the following essential components in the following weight percentage limits based on the total composition:

| | |
|---|---|
| $SiO_2$ | 66–73 |
| $Al_2O_3$ | 15–19 |
| $Li_2O$ | 2.5–4 |
| $MgO$ | 3–7.7 |
| $ZrO_2$ | 1–1.7 |
| $TiO_2$ | 1–<1.9 |

In addition, other useful and purposely added components include $SnO_2$ up to 1.7, $P_2O_5$ up to 3 (usually 0–2), BaO up to 5, and ZnO up to 3, all in weight percent of the glass composition. Further, small amounts of residual arsenic and antimony oxides are often present in the compositions, since arsenic and antimony compounds are often used as fining agents. In actual practice, arsenic, expressed as $As_2O_3$, is usually present in amounts not more than 0.3 weight percent, and antimony, expressed as $Sb_2O_5$, is seldom present in amounts over 1 weight percent. Also $Na_2O$ while not particularly desirable, is often present to a certain degree as an impurity, usually in amounts not over 1.5 weight percent. Further, when $As_2O_3$ is used as a fining agent, it is commonly added together with a little $NaNO_3$, a well-known practice. Another additive sometimes employed is F, usually in amounts not exceeding 0.4 weight percent. It is, of course, added as a salt in the usual manner, and seems to aid the crystallization process somewhat when it is employed. Thus the compositions contain the following, aside from F and such fining agents as may be used:

| | |
|---|---|
| $SiO_2$ | 66–73 |
| $Al_2O_3$ | 15–19 |
| $Li_2O$ | 2.5–4 |
| $MgO$ | 3–7.7 |
| $ZrO_2$ | 1–1.7 |
| $TiO_2$ | 1–1.9 |
| $SnO_2$ | 0–1.7 |
| $P_2O_5$ | 0–3 |
| $BaO$ | 0–5 |
| $ZnO$ | 0–3 |

The preferred composition of thermally crystallizable glass consists essentially of the following components in the following weight percent ranges:

| | |
|---|---|
| $SiO_2$ | 68–72 |
| $Al_2O_3$ | 16–18 |
| $Li_2O$ | 3–4 |
| $MgO$ | 3–5 |
| $ZrO_2$ | 1–1.7 |
| $TiO_2$ | 1.2–2.4 |
| $P_2O_5$ | 0.8–2 | which by in situ crystallization is converted to a glass-ceramic product containing a multitude of opaque crystals substantially homogeneously dispersed in a glass matrix throughout said article, essentially all of which crystals are in their largest lineal dimension less than about 30 microns across, said glass-ceramic having an average lineal coefficient of thermal expansion of less than $20 \times 10^{-7}/°$ C. over the range from 25 to 300° C.

The process of the present invention is not limited to the specific glass composition that was used for the foregoing example. The process is applicable to many other types of glasses that have been ion exchanged using alkali metal salts of inorganic acids in molten form and to other types of glasses, especially silicate glass containing alkali metal ions capable of ion exchanging.

W. A. Weyl and E. C. Marboe in their book entitled "The Constitution of Glass," volume II, Part One, published in 1964 by Interscience Publishers, a division of John Wiley & Son, Inc., New York, N.Y., presents information regarding many types of representative inorganic glasses. A number of these types of inorganic glasses are not the glass used in the present invention, because they do not contain alkali metal oxide and thus are not useful in the present invention which requires an alkali metal oxide, i.e., an alkali metal bonded through oxygen to the basic glass forming structure. The representative glasses useful in the present invention are the alkali metal silicate glasses, the alkali metal silicates containing alkaline earth oxide or oxides in substantial amount, which Weyl and Marboe refer to as alkali-alkaline earth silicates, alkali aluminosilicates, and alkali borosilicates. Other silicate glasses useful in the present invention include alkali metal oxide-zirconia-silica glasses, alkali metal oxide-titania-silica glasses as well as lead-alkali silicate glasses that are referred to on page 4 of the book by E. B. Shand entitled "Glass Engineering Handbook," Second Edition, published in 1958 by McGraw-Hill Book Company, Inc., New York, N.Y. Some of the phosphate glasses contain alkali metal oxide, as can be seen from page 581 of the book by Weyl and Marboe mentioned above and such glasses may be treated by the process of the present invention to form articles of this invention.

It is seen from the foregoing that there are many types of silicate glasses that contain silica and alkali metal oxide. Some contain one or more other oxides that are real or probable glass formers and some contain other oxides as glass modifiers, as these terms are used by Weyl and Marboe. Such chemical elements are shown in Table XXII on page 225 of volume I (published in 1962) of their book mentioned above. Some contain both other glass formers and other glass modifiers. These silicate glasses containing alkali metal oxide have compositions that contain the following components in the indicated percent ranges:

| | Percent by weight |
|---|---|
| $SiO_2$ | 35–88 |
| $M_2O$ | 1–48 |
| $Al_2O_3$ | 0–40 |
| $CaO$ | 0–15 |
| $MgO$ | 0–28 |
| $BaO$ | 0–15 |
| $SrO$ | 0–15 |
| $B_2O_3$ | 0–15 |
| $ZrO_2$ | 0–25 |
| $TiO_2$ | 0–12 |
| $SnO_2$ | 0–2 |
| $P_2O_5$ | 0–10 |
| $As_2O_5$ | 0–3 |
| $Sb_2O_5$ | 0–3 | wherein $M_2O$ refers to the total of alkali metal oxide and, when the alkali metal oxide is lithium oxide, potassium oxide, rubidium oxide or cesium oxide, it constitutes a maximum of about 25% by weight of the glass composition. The content of alkali metal oxide to be at least partially replaced in a surface layer by another alkali metal oxide preferably constitutes at least 2% and for glasses, other than glass-ceramics, it is especially preferred that it constitutes at least 5%.

For those glass compositions that are thermally crystallizable to form glass-ceramics, antimony oxide or arsenic oxide is part of the batch material to form the glass. Up to about 1% by weight of either or total of both is used. They are used as fining agent or oxidizing agent. Most of these oxides are lost by vaporization in the glass-making furnace so that the final glass composition will actually contain at most only a few tenths of one percent. When arsenic oxide is used as fining agent there is commonly used also in the batch, a small amount of sodium nitrate, but it is not shown.

Fluorine as a salt is commonly used in batch material as an additive in an amount usually not exceeding 0.3% by weight in the final composition. Fluorine is believed to aid crystallization; but its content of the composition is limited to a low value, because it accelerates the crystallization, sometimes with an undesirable exothermic effect.

Within this glass composition, it will be apparent to one skilled in the art that there are narrower limits to the ranges of the individual oxides depending upon which ones are present to form a compatible mixture as a melt that when cooled will be a glass. These glasses are per se no part of the present invention. Instead, they are the materials that are treated by the process of this invention to form the improved glass articles. However, various classes of glasses within this broad type are presented below for purpose of illustrating the cited variation of glasses useful in the present invention.

The simplest silicate glass containing alkali metal oxide is the binary type. As pointed out on page 17 of the book entitled "Glass-Ceramics" by P. W. McMillan published in 1964 as a U.S. edition by Academic Press Inc., New York, N.Y., two-component glasses can be prepared for combinations of alkali metal oxides with either silica, boric oxide or phosphorus pentoxide. In the case of silica, there is a limitation on the maximum mole percent of alkali metal oxide as follows: 40% for lithium oxide; 47% for sodium oxide and 50% for potassium oxide. At a higher alkali metal oxide content there will be crystallization or devitrification during cooling of the melt. Replacement of part of one alkali metal by another in such binary glasses, in accordance with the process of the present invention usually would require temperature and time factors economically unfeasible at the present time. Furthermore, mixtures of alkali metal oxides in alkali metal oxide-silica binary glasses have expansion coefficients that show a maximum for specific ratio and partial exchange of one alkali metal for another could result could result in no strengthening of the glass. Again it is apparent that the mole percent of silica should not be too high or too low, at least in the case of substitution of potassium for sodium. Such expansion coefficients are shown in Table LII on page 496 of the book by Weyl and Marboe mentioned above.

In view of the foregoing relating to a binary system, the preferred glasses used in the present invention are those containing other metal oxides and/or other glass network formers in addition to alkali metal oxide and silica. The following presents various examples of multicomponent glass systems.

One example is the class of glasses composed of silica, one or more alkali metal oxide, and one or more alkaline earth metal oxide. A common glass representative of this class is the alkali-lime-silica glass, such as used for window sheet glass, plate glass and container glass. In these commercial glasses the alkaline earth metal oxide content is usually lime or a mixture of calcia and magnesia such as is present in a dolomitic lime. The approximate composition of such commercial glasses on a weight basis is as follows: 70–74% silica, 12–16% soda, either 10–13% calcia and magnesia total or 8–12% calcia and 1–4% magnesia. Alumina is present is about 0.5–1.5% by weight for sheet and plate glass while for container glass it is usually 1.5–2.5%, but in some cases exceeds 5%. This glass within the low alumina content can be ion exchanged to improve its strength but upon abrasion most, if not all, of the increased strength is lost and thus the ion exchange treatment is suitable only when the product is not subjected to abrasion during its use. However, as disclosed and claimed by William E. Smith in a patent application Ser. No. 504,160 with common assignee, that was filed on Oct. 23, 1965 and entitled "Process and Product" it is possible to provide an alkali metal oxide-alkaline earth metal oxide-silica glass, containing such small amount of alumina or containing no alumina, that by ion exchange has an improved strength, even after a substantial degree of abrasion. The glass compositions and range of glass composition disclosed in said application of William E. Smith are hereby incorporated by reference.

Another class of glasses within the broad type of alkali metal silicate glasses is the lead-alkali metal silicate glass, in which the alkali metal oxide is potassium oxide alone or with soda, i.e., sodium oxide, as shown in Table I–1 on page 4 of Shand's book mentioned above. Similarly, another class of glasses is the borosilicate glass system which is illustrated by glass numbers 10, 11 and 12 in Table I–1.

Another class of glasses useful in the present invention is the alkali aluminosilicate glass compositions which are disclosed in U.S. patent appliction Ser. No. 181,887 filed Mar. 23, 1962, now abandoned, on which French Pat. No. 1,329,124 and South African Pat. No. 62/2,353 are based in part. This U.S. application discloses as the broad range for such composition on a weight basis: 50–75% silica; at least 5% and preferably from 10–25% alumina; and at least 5%, preferably 10–25%, $Na_2O$, with the alumina and $Na_2O$ content preferably constituting at least 15% of the glass composition and with these two plus the silica constituting at least 85% of the glass composition. It is indicated that divalent metal oxides, potassium oxide, boron oxide, titania, phosphorous pentoxide and fluorine may be present up to a maximum individual content of 10% and collectively up to a maximum of 15%. It is also stated that lithium oxide may be present but should not exceed 1%. Because some of these limitations are based upon the attaining of the high strength even after abrasion, such limitation, although preferred, is not a limitation on the present invention.

Another class of glasses of the broad alkali metal oxide-silica type is the lithium silicate glass described in U. S. patent application Ser. No. 181,886 filed on Mar. 23, 1962, now abandoned, on which French Pat. No. 1,329,125 and South African Pat. No. 62/2,352 are based. The U.S. application discloses that this glass contains on a weight basis 46–88% silica and 4–29% lithia. This glass may contain alumina to constitute the remainder, if any, but the ratio of silica to alumina should be at least 2:1. Thus it is seen that this class of glasses can be the binary type mentioned above, but when alumina is present it is the alkali metal aluminosilicate also mentioned above. Instead of alumina, or for part of it, there may be present one or more of the following constituents: zirconia; titania; and boron oxide. In addition other alkali metal oxides, namely, sodium oxide and potassium oxide, may be present along with lead oxide (PbO) and fluorine up to a total of 15 mole percent. Of course, some of these limitations relate to the compositions which provide the maximum mechanical strength after abrasion, but such is not a limitation for the present invention in its broadest sense.

A further class of glasses that contain ion exchangeable alkali metal ions is the glass composition disclosed in U.S. patent application Ser. No. 181,888 filed Mar. 23, 1962, now abandoned on which French Pat. No. 1,329,126 and South African Pat. No. 62/2,354 are based. In this U.S. application this glass composition is described as constituting at least 10%, preferably at least 20%, by weight of sodium oxide, at least 5% by weight of zirconia and the balance silica, except for lithia (lithium oxide), if present, which normally should not exceed 1% by weight and except for optional compatible ingredients including divalent metal or oxides, potassium oxide, boron oxide, phosphorus pentoxide, titania and fluorine which individually may be present in an amount up to 10 percent by weight and collectively may be present in an amount up to 15% by weight. In the ternary glass system the composition can be, e.g., 60 to 75% by weight of silica, 5 to 20% by weight of zirconia and 20% by weight of sodium oxide. Again some of these limitations, not relating to glass forming, are not precise limitations relative to the present invention.

U.S. patent application Ser. No. 228,255 filed Oct. 4, 1962, now Pat. No. 3,287,200, on which French Pat. No. 1,375,995 is based discloses that alkali-alkaline earth metal silicate glasses, which may contain alumina, boron oxide and various compatible inorganic oxides, can be ion exchanged using alkali metal salts. These glasses contain by weight in excess of 40%, e.g., 65–75% silica, 0–15% boron oxide, 0–35% alumina, 0–25% calcium oxide, magnesia, strontia, barium oxide, lead oxide and/or zinc oxide and combinations thereof, 0–10% titania, 0–10% potassium oxide and 2–20% sodium oxide and/or lithium oxide. Typical glass compositions are described and these are ion exchanged for strengthening of the glass.

U.S. patent application Ser. No. 249,790 filed Jan. 7, 1963, now Pat. No. 3,287,201, on which South African Pat. No. 63/5,619 is based in part, discloses glass compositions, similar to those in the foregoing U.S. application on which French Pat. No. 1,375,995, as capable of ion exchange. These compositions contain by weight 65–75% silica, 10–20% sodium oxide, 0–5% potassium oxide, 3–15% calcium oxide, 0–10% magnesia, 0–5% alumina and 0–5% barium oxide. Some of the sodium oxide can be replaced by additional potassium oxide.

U.S. patent application Ser. No. 252,324 filed Jan. 18, 1963, now abandoned, on which South African Pat. No. 63/5,747 is based in part, discloses another class of glass compositions which are alkali silicate that contain magnesia and/or zinc oxide, with or without alumina. In these compositions alkaline earth metal oxides may be absent. These glasses are stated as containing by weight in excess of 40%, e.g., 55–75% silica, 0–40% alumina, 0–25% calcium oxide, magnesia, strontia, barium oxide, lead oxide and/or zinc oxide and combinations thereof, 0–10% titania, 0–10% potassium oxide, and 2–20% sodium oxide and/or lithium oxide. A representative range for such glass composition is as follows:

|  | Percent by weight |
|---|---|
| $SiO_2$ | 55–70 |
| $Al_2O_3$ | 1–30 |
| MgO and/or ZnO | 3–10 |
| $Li_2O$ | 2–8 |
| $Na_2O$ | 4–8 |
| $K_2O$ | 0–2 |

U.S. patent application Ser. No. 264,708 filed Mar. 12, 1963, now abandoned, on which South African Pat. No. 63/5,619 is based in part, relates to similar glass compositions that are required to be lithia-containing. A representative range for such glass composition is as follows:

|  | Percent by weight |
|---|---|
| $SiO_2$ | 55–75 |
| $Li_2O$ | 3–20 |
| $Na_2O$, (when present) | 1–22 |
| $K_2O$ | 0–5 |
| $Al_2O_3$, (when present) | 10–30 |
| MgO and/or ZnO | 0–5 |
| $ZrO_2$, (when present) | 3–20 |
| $Al_2O_3$ and $ZrO_2$ | 13–33 | with mole ratio of $Li_2O:Na_2O$ between 0.2:1 to 5:1 and fluorine as fining agent is present when alumina is present. In addition to the above oxides, such glasses can contain by weight: 0–10% titania; 0–3% barium oxide and/or lead oxide; and 0–1% $Sb_2O_3$, $As_2O_3$, phosphorus pentoxide and fluorine. Calcium oxide in an unstated amount may be present. Usually when both lithia and soda are present, their combined total ranges from 5–25% by weight.

All of the foregoing classes of glasses are the first of the three types of glasses mentioned above in the foregoing definition of the term "glass." The glass compositions of the second and third types, under that definition, are described below but some of them as glass-ceramics, at least resulting from a specific heat treatment may not be ion exchanged, although they are ion exchanged as the thermally crystallizable glass composition. This limitation is not peculiar to the present process. Instead it has been discovered as a limitation when using the conventional ion exchange process that utilizes a molten alkali metal nitrate.

The glass-ceramics preferably used in the present invention are opaque or translucent. Especially preferred are the opaque glass-ceramics which contain a multiplicity of crystals in a glassy matrix wherein the average diameter of the individual opaque crystals is less than about 30 microns across the largest dimension. The average lineal coefficient of thermal expansion of these opaque glass-ceramics is generally less than about $20 \times 10^{-7}/°$ C. (between 25° C. and 300° C.)

Examples of thermally crystallizable silicate glass compositions are given in U.S. Pat. No. 2,920,971. On the basis of the actual contents of various ingredients of these glasses presented in that patent the range of the compositions is as follows:

|  | Percent by weight |
|---|---|
| $SiO_2$ | 56.1–73.1 |
| $Al_2O_3$ | 12.1–15.3 |
| $Li_2O$ | 3.0–5.2 |
| $Na_2O$ | 0–1.7 |
| $K_2O$ | 0–0.2 |
| CaO | 0–11.1 |
| MgO | 0–8.8 |
| $TiO_2$ | 4.5–13.8 |
| $ZrO_2$ | 0–3.9 |

In some of these compositions fluorine is present as a fining agent. These compositions after controlled thermal crystallization are glass-ceramics and some of these, provided there is suitable heat treatment, are capable of ion exchanging lithium in the glass-ceramic with an alkali metal in an inorganic salt bath and thus capable of being ion exchanged by the method of the present invention.

U.S. Pat. No. 3,157,522 discloses a class of glass and glass-ceramic therefrom. The range for the composition is as follows:

|  | Percent by weight |
|---|---|
| $SiO_2$ | 55–75 |
| $Al_2O_3$ | 12–36 |
| $Li_2O$ | 2–15 |
| $TiO_2$ | 3–7 |
| $SiO_2$ and $TiO_2$ | 58–82 | with the recited ingredients constituting at least 95% of the composition and the weight ratio of $Li_2O:Al_2O_3$ being between 0.1:1 and 0.6:1.

Another class of thermally crystallizable glass composition that can be ion exchanged in the glass form and by proper heat treatment can be exchanged as a glass-ceramic is disclosed in Japanese patent Showa 37/15,320 filed Sept. 27, 1962. The range of this composition is as follows:

|  | Percent by weight |
|---|---|
| $SiO_2$ | 48–73 |
| $Al_2O_3$ | 14–35 |
| $Li_2O$ | 4–10 |
| $ZrO_2$ | 2–6 | and wherein the sum of recited ingredients, other than zirconia, is greater than 85% of the composition.

Belgian Pat. No. 609,529 describes another thermally crystallizable glass composition having the following composition:

|  | Percent by weight |
|---|---|
| $SiO_2$ | 48–73 |
| $Al_2O_3$ | 14–25 |
| $Li_2O$ | 4–10 |
| $TiO_2$ | 0–1.8 |
| $ZrO_2$ | 2–6 | wherein the total of the recited ingredients, other than titania and zirconia, constitutes at least 85% of the glass. Many of the specific compositions that are disclosed contain 3% by weight of $B_2O_3$.

Belgian Pat. No. 633,889 discloses thermally crystallizable glass compositions and glass-ceramics therefrom, both of which can be ion exchanged to replace one alkali metal ion by another. Such compositions contain silica, alumina, lithium oxide, boron oxide and 3–7% by weight of MgO and/or ZnO plus a small quantity of a nucleating agent. The typical composition range indicates that the silica content would be 55–66% by weight, the alumina content would be 13–22% by weight and the lithium oxide content would be 2.5–5% by weight.

Another class of thermally crystallizable glass compositions that is ion exchangeable is disclosed in U.S. Pat. No. 3,170,805 in which the major constituents are silica, lithium oxide and zinc oxide in the weight percent ranges of 34–81, 2–27 and 10–59, respectively. Other constituents may be present as indicated, and $P_2O_5$ in the amount of 0.5–6% by weight where metallic nucleating agents are used.

Thermally crystallizable glass compositions and glass-ceramics therefrom are disclosed in U.S. patent application Ser. No. 464,147, filed June 15, 1965, by Clarence L. Babcock, Robert A. Busdiecker and Erwin C. Hagedorn, with common assignee entitled "Product and Process for Forming Same." This class of glass composition contains the following ingredients:

| | Percent by weight |
|---|---|
| $SiO_2$ | 50–75. |
| $Al_2O_3$ | 16–35. |
| $Li_2O$ | 3–5.5. |
| Nucleating agent | Variable. |
| $Li_2O$ and nucleating agent | At least 5.5. |

The disclosure in the application of batch materials and method of manufacture of the glass, the heat treatment of the glass to obtain glass-ceramics, are hereby incorporated by reference.

The amount of nucleating agent, such as titania and zirconia, depends upon the particular composition and the particular nucleating agent or combination of nucleating agents, etc. Metal oxides as colorants may be present in an amount of 0.005–2% by weight. To provide lower expansion characteristics to the glass-ceramic that can be formed from the glass composition, the components are as follows:

| | Percent by weight |
|---|---|
| $SiO_2$ | 56–68. |
| $Al_2O_3$ | 18–27. |
| $Li_2O$ | 3.4–4.5. |
| CaO | 0–3. |
| ZnO | 0–2. |
| $B_2O_3$ | 0–4. |
| $TiO_2$ | 0–6. |
| $ZrO_2$ | 0–3. |
| MgO | 0–3. |
| $Na_2O$ | 0–1. |
| $P_2O_5$ | 0–3. |
| ($SiO_2$ and $Al_2O_3$) | At least 82. |
| ($SiO_2$, $Al_2O_3$, $B_2O_3$ and $P_2O_5$) | 86–91. |
| (CaO, MgO, ZnO and $Na_2O$) | 2.5–6. |
| ($SiO_2$, $Al_2O_3$, $P_2O_5$, and $Li_2O$) | No more than 93. |
| $TiO_2$ and $ZrO_2$ | 2–6. | where the ratio of (CaO, MgO, ZnO, NaO, and $B_2O_3$) to $Li_2O$ is less than 2.4 and the ratio of $SiO_2$ to $Al_2O_3$ is no more than 3.3 and preferably no more than 3.8.

Another class of glass compositions as thermally crystallizable glass and as glass-ceramics is the subject of U.S. patent application Ser. No. 352,958 filed on Mar. 18, 1964, by William E. Smith, with common assignee and entitled "Glass, Ceramics and Method." The composition consists essentially of the following:

| | Percent by weight |
|---|---|
| $SiO_2$ | 66–73 |
| $Al_2O_3$ | 15–19 |
| $Li_2O$ | 2.5–4 |
| MgO | 3–7.7 |
| $ZrO_2$ | 1–1.7 |
| $TiO_2$ | 1–<1.9 |
| $SnO_2$ | 0–1.7 |
| $P_2O_5$ | 0–3 |
| BaO | 0–5 |
| ZnO | 0–3 | where the total weight percent of $ZrO_2$, $TiO_2$, $SnO_2$ and $P_2O_5$ is at least 2.8, and the total weight percent $Li_2O$ and MgO is 6.3 to 10.5.

The glass compositions of the U.S. patent applications that are presented in the paragraphs immediately preceding form glass-ceramics containing beta-eucryptite and/or beta-spodumene. Glass compositions have been developed for thermally crystallizable glass-ceramics in which the crystals or crystallites or other materials including those in which the crystalline phase is nepheline. Such glass compositions at least as a thermally crystallizable glass can be ion exchanged. One class of such compositions is disclosed and claimed in U.S. patent application Ser. No. 371,089 filed May 28, 1964 by William E. Smith, with common assignee entitled "Glass, Ceramics and Method." This composition contains the following ingredients:

| | Percent by weight |
|---|---|
| $SiO_2$ | 44–52 |
| $Al_2O_3$ | 22–29 |
| $Na_2O$ | 15–22 |
| $TiO_2$ | 6–12 |
| $K_2O$ | 0–3 |
| $SiO_2$ and $Al_2O_3$ | 69–76 |
| $Na_2O$ and $K_2O$ | 17–22 | where the weight ratio of $SiO_2$ to ($Na_2O$ and $K_2O$) is between 2.1 and 3, and the mole ratio of ($Na_2O$ and $K_2O$) to $Al_2O_3$ is at least 1.02. The usually preferred $Na_2O$ range is 16–21% by weight. The disclosure in the application of batch materials and method of manufacture of the glass, the heat treatments of the glass to obtain glass-ceramics, are hereby incorporated by reference.

Another class of glass compositions that form nepheline as a crystal phase in a glass-ceramic contains the following ingredients.

| | Percent by weight |
|---|---|
| $SiO_2$ | 45–57. |
| $Al_2O_3$ | 29–38. |
| $Na_2O$ | 13–22. |
| $TiO_2$ | [1] 1–3. |
| $ZrO_2$ | [1] 1–4. |
| BaO | [1] 2–14. |
| $SiO_2$, $Al_2O_3$ and $Na_2O$ | At least 95. |

[1] In excess over 100% of the sum of $SiO_2$, $Al_2O_3$ and $Na_2O$. $Li_2O$, $K_2O$, $P_2O_5$ and bivalent metal oxides may be present in total less than 5%.

British Pat. No. 869,328 discloses glass compositions that that can be ion exchanged by replacing an alkali metal ion. Such a glass system contains sodium oxide, alumina and silica with titania as a nucleating agent in combination with one or more other agents. The $Na_2O$ content is 7–34 mole percent. Metal oxides used in combination with titania are listed in the British patent and it is indicated that they must constitute at least 1.9 mole percent in excess of the total moles of silica, alumina, sodium oxide, potassium oxide and calcium oxide in the glass composition to provide a controlled thermally crystallizable glass. When crystallized the glass-ceramic contains a nepheline crystal phase.

The term "strain point" is defined on page 659 of the book by Weyl and Marboe mentioned above and in U.S. Pat. No. 2,779,136.

As stated earlier, alkali metal salts of strong inorganic acids are used in carrying out the invention. These are acids that have ionization constants at 25° C. of greater than $1 \times 10^{-3}$ for at least the first hydrogen ion provided by its ionization.

The ion exchange aqueous medium used in the process of the invention can contain salts of other metal ions provided the anion or anions of the alkali metal salt or salts and the metal ion or ions of the other salt or salts are compatible, i.e., a precipitate is not formed. For example, if the other salt is silver nitrate, a chloride of an alkali metal salt cannot be used. Similarly, if the alkali metal salt is a sulfate, the other salt cannot be a barium salt. Examples of other salts, that are not alkali metal salts and that may be present in the aqueous medium, are silver nitrate, copper nitrate, cobalt nitrate, nickel nitrate, calcium nitrate, barium nitrate, calcium sulfate, calcium chloride and barium chloride. When sodium salt is used in the aqueous medium to replace lithium in the glass surface layer, salts of alkali metal having a higher atomic number than sodium, for example, potassium salt may be present as the other salt. When sodium salt is used to replace potassium in the glass surface layer with sodium, obviously only a minor amount of a lithium salt or a mixture of lithium salts may be present in the ion exchange aqueous medium as the other salt; otherwise, lithium exchange for potassium would occur instead of the desired sodium exchange for potassium.

Modifications of the present invention will be apparent to one of ordinary skill in the art. Thus the foregoing description has been presented for purpose of illustration and not the purpose of limiting the invention which is limited only by the claims that follow.

What is claimed is:

1. In a process for treating an inorganic article of glass containing alkali metal ions especially as oxide, the steps of
   contacting a surface of said article with an aqueous ion exchange medium consisting essentially of an aqueous solution of an alkali metal salt of a strong inorganic acid, said alkali metal of said salt being different from the alkali metal of said alkali metal oxide in said glass, and the alkali metal ion of said alkali metal salt being larger than the alkali metal ion of said alkali metal oxide,
   contacting said surface with said aqueous ion exchange medium at an elevated temperature in the range 200° C. to 550° C. but below the strain point of the glass and for a time in the range from a few minutes to 30 hours to ion exchange said larger alkali metal ion of the salt with the smaller alkali metal ion the glass to provide a compressive stress layer in the glass, the time being insufficient to provide ion exchange to a substantial degree in the interior portion of the article,
   maintaining a sufficient superatmospheric pressure on the ion exchange medium to prevent boiling of the water content, said salt being present in said ion exchange medium in a concentration of at least 50% of saturation at room temperature,
   separating the article and the ion exchange medium, and cooling the article.

2. The process according to claim 1 wherein the inorganic article is a silicate glass and said alkali metal oxide in said glass constitutes at least 1% by weight of the glass, at least in said surface layer, and the pressure is between about 200 p.s.i.g. and about 1500 p.s.i.g.

3. The process according to claim 2 wherein the glass consists essentially of the following composition, aside from any fluoride content as an additive and any fining agent, expressed as oxides on a weight percent basis:

| | |
|---|---|
| $SiO_2$ | 66–73 |
| $Al_2O_3$ | 15–19 |
| $Li_2O$ | 2.5–4 |
| $MgO$ | 3–7.7 |
| $ZrO_2$ | 1–1.7 |
| $TiO_2$ | 1–<1.9 |
| $SnO_2$ | 0–1.7 |
| $P_2O_5$ | 0–3 |
| $BaO$ | 0–5 |
| $ZnO$ | 0.3 |

4. The process of claim 3 wherein the aqueous ion exchange medium contains between about 180 gms. and about 250 gms. of $NaNO_3$ per 1000 ml. of water, the ion exchange medium contains sufficient strong inorganic acid to provide a pH of between about 2 and 4 at 25° C., the period of time is between about 3 and 24 hours and wherein the glass is a glass-ceramic.

5. The process of claim 3 wherein the aqueous ion exchange medium contains between about 180 and 250 gms. of $NaNO_3$ per 1000 ml. of water, the ion exchange medium contains sufficient nitric acid to provide a pH of between about 2 and 4 at 25° C., the period of time is between about 3 and 24 hours and the glass is a thermally crystallizable glass.

References Cited

UNITED STATES PATENTS

| | | | |
|---|---|---|---|
| 2,779,136 | 1/1957 | Hood et al. | 65—30 XR |
| 2,263,489 | 11/1941 | Day | 65—116 |
| 3,375,155 | 3/1968 | Adams | 65—30 XR |
| 3,382,135 | 5/1968 | Adams | 65—30 XR |

FOREIGN PATENTS 966,734  8/1964  Great Britain.

OTHER REFERENCES

Kistler, S.S., "Stresses in Glass Produced by Non-Uniform Exchange of Monovalent Ions," J. of Am. Cer. Soc., vol. 45, No. 2, pp. 59–68, February 1962.

S. LEON BASHORE, Primary Examiner

J. H. HARMAN, Assistant Examiner

U.S. Cl. X.R.

65—116